May 20, 1952     E. F. COOK     2,597,457
POULTRY LITTER MATERIAL
Filed March 8, 1950
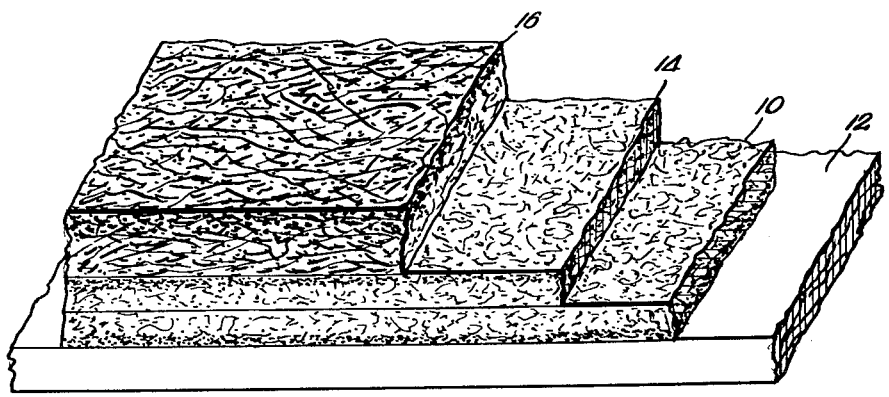
Inventor
Errol F. Cook
by Munro H. Hamilton
Attorney.

Patented May 20, 1952

2,597,457

UNITED STATES PATENT OFFICE 2,597,457

POULTRY LITTER MATERIAL

Errol F. Cook, Marlboro, Mass., assignor to Allied Minerals, Inc., West Chelmsford, Mass., a corporation of Massachusetts Application March 8, 1950, Serial No. 148,490

5 Claims. (Cl. 119—1)

This invention relates to materials and methods employed in poultry houses to form a loose, relatively dry bedding layer of fibrous material such as straw, wood fibers, peat moss, and the like, commonly referred to as "poultry litter," in which poultry stock is afforded an opportunity to move about and pick up feed without becoming exposed to an undesirable moist, acid condition, such as is commonly recognized as promoting the incident of poultry diseases.

It is an object of the invention to devise a finely divided powder-like substance which is hereinafter referred to as a litter treating material and which can be introduced into the constituent fibers of a litter bed and held therein in a "relatively suspended" state so that a preponderance of the particles of litter-treating material are prevented from settling or migrating to the bottom of the litter bed and are thus maintained in a relatively fixed position on the fibers such that the beneficial effect of the treating material may be more fully realized.

Another object of the invention is to provide improved methods and materials for conditioning poultry litters with a view to simplifying and cheapening the operation of preparing the poultry bedding layer of fibrous material and maintaining the fibers of the layer in a loose, friable state such that the mass, as a whole, can be properly aerated with substantial reduction in moisture content and elimination, to a large extent, of poultry odors.

Still another object of the invention is to devise a litter-treating material or filler body which, when combined with a layer of litter fibers, is capable of undergoing agitation resulting from the poultry stock scratching and moving the fibers about, without the filler being displaced and thrown up in clouds of dust, which are highly objectionable.

In a more specific aspect, the invention is concerned with certain problems arising out of poultry bedding of the so-called "built-up litter" type in which fresh amounts of straw or litter-forming material are, from time to time, added to a layer which has been used. A principal reason for resorting to this practice, instead of following the older method of cleaning out old litter and laying a completely fresh layer in its place, is due to the more or less recent discoveries that healthier and more satisfactory poultry stock can be obtained when the birds have some access to old poultry litter containing dung. Recently completed experimental work of recognized standing, Journal of Laboratory and Clinical Medicine, August, 1948, has shown that there is present in some form in the old litter material, an animal protein factor, possibly derived from amino acid compounds, or some other source, but, in any event, having a definite food value.

Although more desirable from some points of view for the foregoing reasons therefor, the built-up litter nevertheless introduces certain disadvantages, chief among which are the occurrence of excessive poultry odors and a tendency for the litter to mat and become packed into a relatively dense, moist body. Hydrated lime has been suggested as an agent for depressing poultry odor and reducing moisture in the litter bed, and from time to time, for a considerable period, there has been limited use of hydrated lime, with many poultry raisers holding the opinion that the caustic nature of lime (CaOH) may cause injury to the poultry stock and may produce an undesirable heating effect in the litter, as well as being unpleasant to handle. With the desirability of built-up litters now being established, the need for overcoming the objectionable aspects of the hydrated lime treatment has become of great interest to poultry men.

One solution to the difficulty outlined lies in using a substitute for hydrated lime, and in this connection I have discovered that much of the difficulty involved in using built-up litters, and especially with their treatment with hydrated lime, may be avoided by utilizing a non-caustic filler material consisting essentially of a finely ground calcium carbonate, or mixture of this compound and magnesium carbonate as found, for example, in the form of limestone. When ground to a properly selected degree of fineness, the particles of $CaCO_3$ develop an unusual stickiness or affinity for fibrous materials, such as straw, wood fibers, peat moss, and the like, with the result that the finely divided product, as a whole, can be relied upon to cling to the fibers very tenaciously and in so doing impart to the fibers desirable properties.

For example, I find that calcium carbonate in the form of limestone, when ground to a very fine state of subdivision and mixed with litter-forming materials of a fibrous nature, is capable of providing a loose, friable mass which is especially characterized by freedom from moisture and a pronounced fluffy condition. Fibers to which this fluffy characteristic has been imparted are exceedingly resistant to moisture retention since they constitute a relatively loosely connected web of material which is very easily aerated. This same fluffy characteristic of the fibrous mass cooperates with a limited odor-absorptive property of calcium carbonate to move air through the poultry litter where it contacts the calcium carbonate particles, thus reducing and depressing ammoniacal poultry odors to a marked degree.

The resiliency and freedom from moisture of a layer of fibers thus treated with adherent $CaCO_3$ particles can be very effectively made use of in superimposing successive layers upon one another to provide the built-up type litter body already referred to. Retention of particles on the fibers of each layer prevents adjacent layers from becoming packed or matted together, and there is little opportunity for moisture to collect. An important advantage derived in this way is a material saving in the cost of the litter material required to be used over a given period.

I have further found that in grinding the $CaCO_3$ to a proper degree of fineness, care must be exercised to secure a definite range of particle sizes. If the calcium carbonate or limestone product is not sufficiently comminuted, relatively coarse particles will settle out or migrate to the bottom of a litter bed where they exert little, if any, beneficial effect. Likewise, if the product is too fine, the particles, although being retained to some extent on the fibers, tend to become thrown up and form clouds of dust as poultry stock moves about in the litter.

I find that satisfactory results are obtained by grinding to an extent such that the product will pass through a 325-mesh screen in amounts lying within a range of from 85% to 99.9% of the total, and, furthermore, that substantially all of the screened product is below 50 micron particle size, and that there is obtained an average mean particle size of from 15 to 20 microns.

It has further been found that in reducing the calcium carbonate to a very finely ground product, such as 325-mesh screen product, a number of additional properties are derived, peculiarly suited to meeting conditions encountered in forming a poultry litter. The drying properties of the finely divided calcium carbonate make it possible for relatively damp used litter fibers which have become matted upon one another, to be reclaimed and revitalized with the filler, and concurrently animal protein factor accumulating in the old litter is more available to the poultry stock. It is also found that the calcium carbonate can, in the course of grinding to a very fine state of subdivision, be subjected to intensive drying operations to reduce the percentage of retained moisture to a value well below one-tenth of one percent. Such a pronounced freedom from moisture in the particles fosters some transfer and absorption of moisture from used litter fibers, or from a damp atmosphere rising from the litter and bearing strong ammoniacal poultry odors.

The finely divided calcium carbonate constitutes a convenient product for furnishing a substance having high mineral feeding value for poultry stock, as a result of which an important part of the feeding diet is taken care of. Moreover, the finely divided calcium carbonate offers an excellent medium for carrying other poultry foods or poultry treating materials, either in an absorbed state in the calcium carbonate, or in the form of a mixture of calcium carbonate and other modifying substances.

These and other objects and novel features of the invention will be more fully understood and appreciated from the following detailed description of specific examples of the poultry litter treating material and its use, as shown in the accompanying drawings, in which The single figure is a diagrammatic view fragmentarily indicating a plurality of layers of litter-forming materials which have been superimposed, one upon another, to form a built-up type of litter, and in which is incorporated the finely divided calcium carbonate product of the invention.

A typical source of calcium carbonate to be utilized in accordance with the invention is a limestone product, commonly known as calcite, showing, for example, the following chemical analysis:

| | Percent |
|---|---|
| Free moisture (loss at 105° C.) | 0.08 |
| Calcium carbonate (calculated from CaO) | 98.07 |
| Magnesium oxide, MgO | 0.36 |
| Silica, $SiO_2$ | 0.51 |
| Ferric oxide, $Fe_2O_3$ | 0.11 |
| Aluminum oxide, $Al_2O_3$ | 0.18 |
| Manganese oxide, MnO | 0.005 |
| Tricalcium phosphate (calculated from $P_2O_5$) | 0.02 |
| Acid-insoluble organic matter | 0.04 |
| Sulfur, S | 0.04 |
| Titanium oxide, $TiO_2$ | 0.00 |
| Arsenic, as—parts per million | 0.7 |

The limestone product is usually obtained from a quarry in the form of crushed stone particles of relatively coarse size, and is then passed through extensive crushing and grinding equipment of well known character. As an instance of one specific treatment, there may be cited the passing of the limestone through conventional roll crushing machine and ball mill and then subjecting to flame drying.

In using the poultry litter filler of the invention, a layer 10 of straw or similar fibrous material is spread over the floor 12 of a poultry house. A light coating of the $CaCO_3$ is then lightly worked into the fibers of the layer, as has been suggested by the stippling in the drawing, so that a relatively larger amount of the filler is incorporated at the uppermost side of the layer. This keeps the fibers dry and free. As the resulting bed is used, there is a gradual disintegration of some of the fibers into a fine powdery residue which is relatively free from moisture. This condition is quite different from the usual situation where fibers gradually become moistened and matted against one another to constitute an unhealthy poultry feeding environment.

When the layer of fibers has been used for a suitable period, a second layer 14 is laid down, and another application of filler made. Since the remaining fibers of the underlying layer are in a relatively dry condition and continue to hold small amounts of filler, the next succeeding layer is resiliently held up to provide a well aerated web in which even more complete drying can take place. This manner of applying the fibers and filler can be repeated for a number of times with material saving of litter and some reduction in the labor of removing used litter material.

In some instances it may also be desired to conduct a more extended agitation of the fibers and filler in the presence of one another, for example by mixing the fibers and fillers in a separate container and then applying both substances simultaneously to the top surface of a built-up litter. Various other ways of incorporating the filler in intimate contact with fiber surfaces may also be employed.

As illustrative of one typical application of filler involving specific amounts, there may be cited the use of 100 lbs. of filler for a built-up litter suitable for accommodating 100 birds and having, for example, a surface area of 400 square feet. This treatment may be repeated at intervals of two weeks, or slightly longer. In cases of excessive moisture accumulation, the periodic amount specified may be increased or the interval between applications shortened.

It is desired again to call attention to and emphasize the importance of the distinctive fluffy character of the litter product after treatment in the manner above outlined. When fibers have been used without filler and have become flattened out, adhering to one another with very little resilience remaining and, in some cases, carrying relatively large amounts of ammoniacal moisture, they are brought into intimate contact with the flour-like filler of the invention. There is an immediate tendency for some of the filler to become attracted to and attached on the fibers, and in so doing to cause the fibers to move apart from one another into separated relation. Thereafter, as the litter material is rolled over or moved about by poultry stock, the fibers tend to slip and slide against one another and take on new life.

Concurrently there is produced a significant change in the physical characteristics of the fibers, especially fibers of straw-like nature, or more finely comminuted fibers, such as those of peat moss. Essentially the change is one of removal of moisture and odor which, it is believed, is brought about in two distinct ways. First, the tiny calcium carbonate particles which are in direct contact with fibers, have a strong absorbent action which takes up moisture as well as ammoniacal compounds and other substances in the moisture. Second, as the fibers are unlocked from their inherent matted relation to one another, an opportunity for very greatly increased aerating effects is provided. As most poultry houses are customarily constructed to insure a good circulation of air, this becomes an important function of the filler, and poultry odors can be more readily controlled.

Another equally important function of the filler relates to the fact that $CaCO_3$ is a strongly alkaline material having a pH of approximately 9, thus constituting an excellent agency for creating and maintaining a basic environment in a poultry litter. As is well known, the presence of acid materials tends to promote the growth of disease organisms and it follows, therefore, that the filler of the invention serves to counteract and neutralize undesirable acidity, thus furnishing a reliable means of preserving a stable desired pH environment.

It will be apparent that many of the disadvantages and high costs of preparing and maintaining poultry litters may be avoided by the treatment of such litters with a filler, in accordance with the invention.

Having thus disclosed my invention, what I desire to claim as new is:

1. An improved poultry litter of the "built-up" type consisting essentially of a plurality of layers of fibrous material superimposed one above another, each of said layers having incorporated in between and on the constituent fibers thereof finely divided $CaCO_3$, the said $CaCO_3$ occurring in a state of subdivision such that from 85% to 99.9% of a representative sample will pass through a 325-mesh screen and substantially all of the screened product is below 50 micron particle size.

2. An improved poultry litter including a plurality of layers of fibrous material which contain finely divided $CaCO_3$, the particles of $CaCO_3$ occurring in a state of subdivision in which they exhibit a marked degree of adhesion to the fibrous material and thereby substantially resist migration to the bottom of the litter, the adherent $CaCO_3$ particles being substantially all of a particle size below 50 microns.

3. A multiple layer poultry litter of fibrous material in which successive layers have been applied after a preceding layer has been subjected to use in a poultry house, each layer containing small amounts of a finely divided filler which includes $CaCO_3$, the filler being incorporated at the upper side of respective layers and attached to the constituent fibers of the layers to produce a loose friable mass in which substantial amounts of the $CaCO_3$ resist migration to the bottom of the litter, the filler being substantially limited to an average particle size of from 15 to 20 microns.

4. An improved poultry litter comprising a plurality of layers of fibrous material superimposed one upon another, each layer containing at its uppermost portions small amounts of finely divided limestone particles, which are attached to the constituent fibers of respective layers sufficiently strongly to resist settling to thereby maintain the layers of fibers in a loosely disposed, moisture-free condition, the limestone particles having an average size of from 15 to 20 microns 5. An improved poultry litter comprising a bedding occurring in layer form and characterized by a distinctive fluffy appearance, the bedding consisting a filler of finely divided limestone and a litter-forming material, the constituent fibrous elements of the litter-forming material being maintained by the filler in a substantially separated relation with respect to one another to produce a loose friable mass, and the filler being substantially limited to a particle size of from 15 to about 20 microns.

ERROL F. COOK.

REFERENCES CITED

The following references are of record in the file of this patent:

Extension Bulletin #349, Institute of Agricultural Sciences, "Poultry Pointers #20 Revised," written by the State College of Washington.